United States Patent [19]

Ishikawa

[11] Patent Number: 5,932,064

[45] Date of Patent: Aug. 3, 1999

[54] METHOD FOR CONTINUOUSLY MANUFACTURING TAPE STRIP FOLDED ABOUT A RING

[75] Inventor: Kiichiro Ishikawa, Marietta, Ga.

[73] Assignee: YKK Corporation of America, Marietta, Ga.

[21] Appl. No.: 08/951,391

[22] Filed: Oct. 16, 1997

Related U.S. Application Data

[62] Division of application No. 08/605,859, Feb. 23, 1996, Pat. No. 5,795,434.

[51] Int. Cl.⁶ ................................................ B29C 53/40
[52] U.S. Cl. ........................................ 156/475; 156/489
[58] Field of Search .................................. 156/475, 489

[56] References Cited

U.S. PATENT DOCUMENTS 3,960,534   6/1976   Oates ............................................ 65/43

Primary Examiner—Francis J. Lorin
Attorney, Agent, or Firm—Hill & Simpson

[57] ABSTRACT

As tape drawer rollers are driven for intermittent rotation, a continuous tape is intermittently fed along a tape traveling path with a leading end portion of the tape inserted through a ring at a tape folding section. When the continuous tape has been fed by a predetermined length, the feeding of the tape is stopped and then the lower end portion of the tape inserted through the ring is bent about the ring by a first bending member. Then a cutting device severs a predetermined length of tape strip off the continuous tape, whereupon the an upper half of the severed tape strip is bent about the ring by a second bending member, thus providing a folded tape strip having a laminate portion. Finally the folded tape strip is discharged out of a machine after part of its laminate portion is fused by a fusing device.

11 Claims, 11 Drawing Sheets

METHOD FOR CONTINUOUSLY MANUFACTURING TAPE STRIP FOLDED ABOUT A RING

This is a divisional of application Ser. No. 08/605,859, filed Feb. 23, 1996 now U.S. Pat. No. 5,795,434.

BACKGROUND OF THE INVENTION

1. Field of the Invention

This invention relates to a method of and an apparatus for continuously manufacturing a tape strip folded about a ring, which is to be used as a connector between a frame and a sheet in a trampoline and between a bag and a band end, and also to a tape twist correcting device.

2. Description of the Related Art

In the conventional art, the above-described type tape strip folded about a ring is manufactured by severing a predetermined length off a continuous tape, inserting the thus obtained tape strip through the ring, and folding the tape strip through and about the ring outwardly. And in order to facilitate a subsequent sewing work, a laminate portion of the folded tape strip is provisionally secured with a thread, a staple or any other fastener to keep the tape strip in a folded form, which is performed manually.

FIG. 15 of the accompanying drawings shows a trampoline 1 in which the conventional type tape strips 10 each folded about a ring 12 are used as connectors between a circular or rectangular frame 1a and a sheet 1b of the same shape inside the frame 1a. For other purposes, these tape strips may be used as connectors between a bag and a band, for example. The laminate portion of a folded tape strip, which is similar to that of FIG. 14(B), is attached to the sheet 1b or the bag. In the trampoline 1, each ring 12 attached to the respective folded tape strip 10 is connected to the frame 1a via a spring 13. In the folded tape strip attached to the bag, the band is connected to the ring directly or by a non-illustrated swivel joint.

Generally, the ring 12 is a triangular or rectangular ring formed from a metal wire or molded of reinforced synthetic resin, and on the other hand, the tape strip 11 requires adequate strength and rigidity and is accordingly a thick woven, knit or non-woven cloth of fibers made of thermoplastic synthetic resin, such as polyamide, polyester or polypropylene, or a thermoplastic elastomeric resin tape having, as a core, a cloth of the above-mentioned kind.

According to the conventional technology, however, production of the tape strip folded about the ring chiefly relies on manual work and hence needs large manpower, which would be very inefficient. Further, since the thread and staple used in temporarily securing the folded tape strip are unnecessary in a final product, such as a trampoline, and especially in the case of the staple, such a fastener has to be removed from the folded tape strip by hand at the final stage of production, for preventing any injury of the user, thus lowering the productivity.

Further, when a continuous tape is drawn from a tape container, for example, in the production of the tape strip folded about the ring, the continuous tape tends to be twisted; this twist would be a large cause for hindering the continuous processing of the continuous tape.

SUMMARY OF THE INVENTION

It is a primary object of this invention to improve the efficiency of production of tape strips each folded about a ring so that production of a final product using such folded tape strips can be facilitated.

Another object of the invention is to provide a tape twist correcting device for automatically correcting a twist of a continuous tape while the continuous tape is drawn in a twisted form from a tape supply section.

The above and other objects and additional features as well as advantageous results will become manifest from various preferred embodiments described below.

In order to accomplish the above objects, according to a first aspect of the invention, there is provided a method for continuously manufacturing a folded tape strip with a ring, comprising the steps of: successively supplying rings to a tape strip folding section via a ring supply path; intermittently feeding, in response to intermittent driven rotation of tape drawer rollers, a continuous tape by a predetermined length at a time from a tape supply section to the tape strip folding section; inserting a leading end portion of the continuous tape through the ring at the tape strip folding section while the continuous tape is fed; stopping the feeding of the continuous tape when the continuous tape has been fed by the predetermined length; severing the predetermined length of tape strip off the continuous tape, by a cutter operable when the feeding of the continuous tape is stopped, with the leading end portion of the continuous tape being inserted through the ring at the tape strip folding section; folding the tape strip on itself through the ring by a tape strip bending means at the tape strip folding section; fusing at least part of a laminate portion of the folded tape strip; and discharging the resulting folded tape strip with the ring out of a folded tape strip manufacturing machine.

The rings, which are each formed by bending a metal wire or molded of synthetic resin and have each a straight portion, are successively fed along a ring supply path by a vibrating parts feeder. The tape is made of woven, knit or non-woven cloth of thermoplastic fibers, or a thermoplastic synthetic resin tape having a woven cloth as a core.

Preferably, the intermittent driven rotation of the tape drawer rollers is performed by a stepping motor. The continuous tape is inserted through the ring perpendicularly to a general plane of the ring and is then folded into a completely laminate form around the straight portion of the ring, or the continuous tape is inserted through the ring diagonally with respect to the general plane of the ring and parallel to the straight portion of the ring and is then folded about the straight portion of the ring in a crossed form. In the case where the continuous tape is fed vertically downwardly, it is preferable that the folding includes bending the lower end portion of the continuous tape, with the continuous tape being bent about the ring, substantially simultaneously with stopping of rotation of the tape drawer rollers, then the tape strip is severed by the cutter, and then the upper half of the tape strip is bent about the ring in the same direction.

During the folding, it is preferable that the tape strip is folded with its upper and lower halves in a non-contact posture, and then part of confronting inner surfaces of the upper and lower halves of the tape strip is melted by inserting a heating member into the non-contact space of the tape strip, whereupon the melted confronting inner surfaces are pressed against each other by first and second pressing means after retracting the heating member from the non-contact space. Alternatively, the tape strip may be folded in an intimate laminate form, and part of the laminate portion may be spot-fused by applying ultrasonic waves.

According to a second aspect of the invention, the foregoing method is carried out effectively by a machine for continuously manufacturing a tape strip folded through a ring, comprising: a tape supply section accommodating a continuous tape; tape drawer rollers adapted to be driven for controlled rotation to intermittently draw a predetermined length of the continuous tape at a time from the tape supply section along a tape traveling path; a ring supply path along which rings are to be successively supplied, the supply path meeting the tape traveling path; ring positioning means for positioning the ring, which is supplied via the ring supply path, in a fixed position in such a posture that a leading end portion of the continuous tape can be inserted through the ring; tape severing means situated between the tape drawer rollers and the ring supply path and operable, while the feeding of the continuous tape is stopped, for severing a predetermined length tape strip off the continuous tape with a leading end portion of the continuous tape being inserted through the ring; tape bending means situated adjacent to the ring positioning means for folding the tape strip of the predetermined length through the ring; tape fusing means for fusing at least part of a laminate portion of the folded tape strip; and discharging means for discharging the fused tape strip out of the machine.

Preferably, the rings are fed successively to the ring supply path by a vibrating parts feeder, and at the same time, the tape drawer rollers are intermittently rotated by a stepping motor. And the ring positioning means is a disc rotatable in synchronism with the rotation of the tape drawer roller and having in its peripheral edge a cutout in which the ring is engageable. The disc also serves as the discharging means.

Further, with the respective tape traveling paths of the tape drawer rollers, the tape severing means and the ring positioning means being vertically aligned with one another, the ring positioning means is located in such a manner that the ring is positioned in a horizontal posture, the tape bending means being operable to fold the tape strip in a completely laminate form with the leading end portion of the continuous tape inserted through the ring perpendicularly to the general plane of the ring. This tape strip folded about the ring in a completely laminate form is suitable for a connector between a bag and a band.

Alternatively, with the respective tape traveling paths of the tape drawer rollers, the tape severing means and the ring positioning means being vertically aligned with one another, the ring positioning means may be located in such a manner that the ring is positioned in an inclined posture with respect to the horizontal plane, the tape bending means being operable to fold the tape strip in a crossed form with the leading end portion of the continuous tape inserted through the ring diagonally with respect to the general plane of the ring. The obtained tape strips each folded about the ring in a crossed form are suitable for connectors between a frame and a sheet in a trampoline.

In the apparatus, the tape strip bending means has first and second bending members situated upstream and downstream, respectively, of the tape traveling paths sandwiching the ring positioning means therebetween, each of the first and second bending member being movable perpendicularly toward and away from the tape traveling path.

Preferably, the tape strip fusing means includes a heating member movable into and out of a non-contact space of the folded tape strip for melting confronting inner surfaces of the tape strip, and first and second pressing means movable toward and away from outer surfaces of the folded tape strip for releasably pressing the melted confronting inner surfaces of the tape strip against each other, which are melted while the heating member is inserted in the non-contact space of the tape strip, to fuse the confronting inner surfaces.

Alternatively, the heating member may be substituted by ultrasonic fusing means situated one on each side of the intimate laminate portion of the folded tape strip for fusing part of the laminate portion.

According to a third aspect of the invention, a twist of the continuous tape can be corrected by a device for correcting a twist of a tape while the tape is continuously drawn into a tape traveling path from a tape supply section, comprising: a rectangular tubular body in which a tape passageway adapted to be positioned in alignment with the tape traveling path is defined; and a tape inlet in the shape of a generally equilateral triangle with its bottom side generally similar in width to the tape passageway and its apex adapted to be directed upstream of the tape traveling path. With the tape twist correcting device, since the tape twist caused when the continuous tape was drawn from the tape supply section is automatically eliminated as stroked by the equilateral triangular tape inlet. The application of this tape twist correcting device should by no means be limited to the above-mentioned machine, and the correcting device may be used in a tape drawing section of any different type machine for continuously processing a continuous tape.

DETAILED DESCRIPTION OF THE PREFERRED EMBODIMENTS

Figure 1:
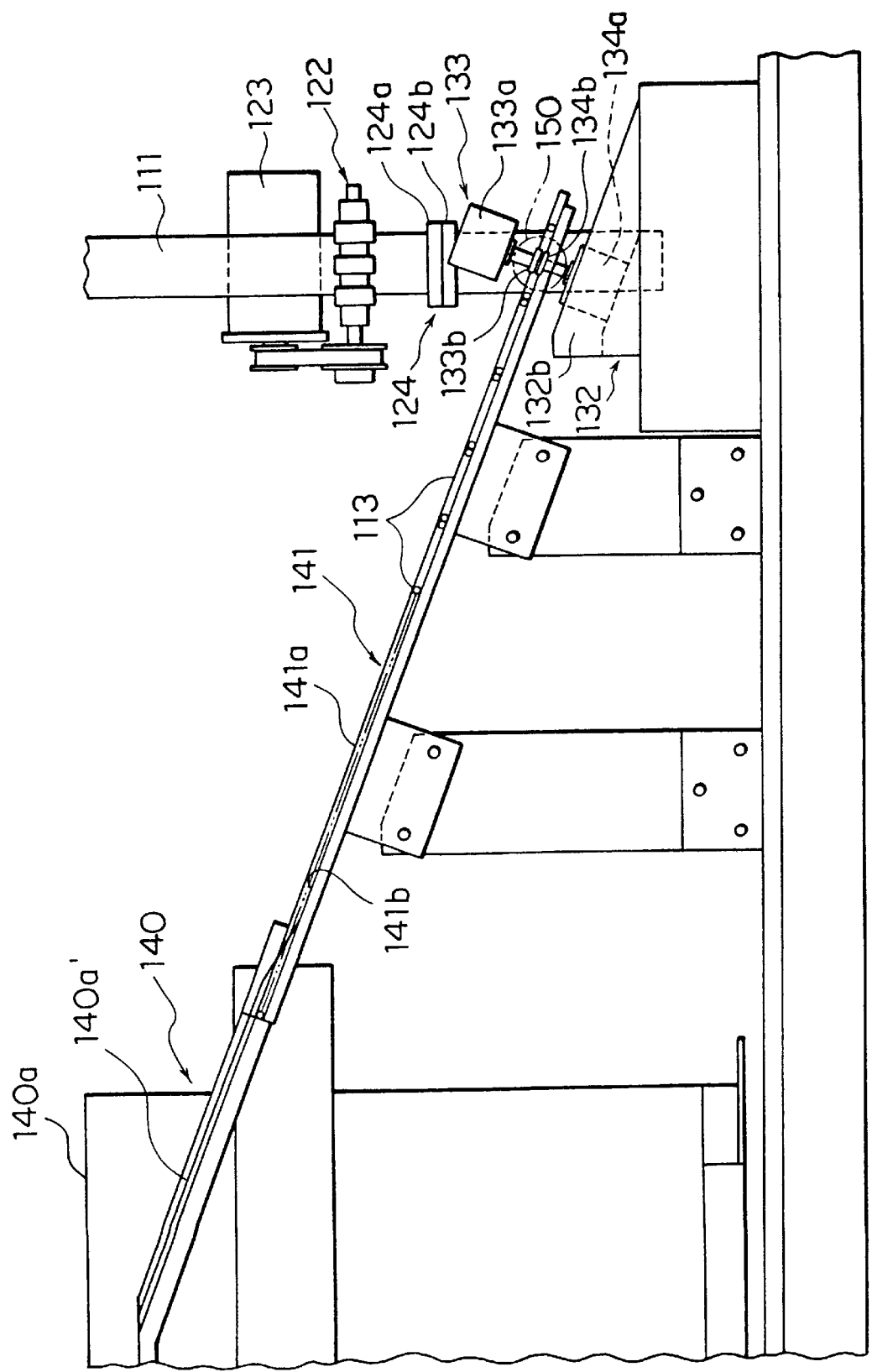
FIG. 1 is a front view of a machine for manufacturing a tape strip folded about a ring, according to one embodiment of this invention.
Figure 2:
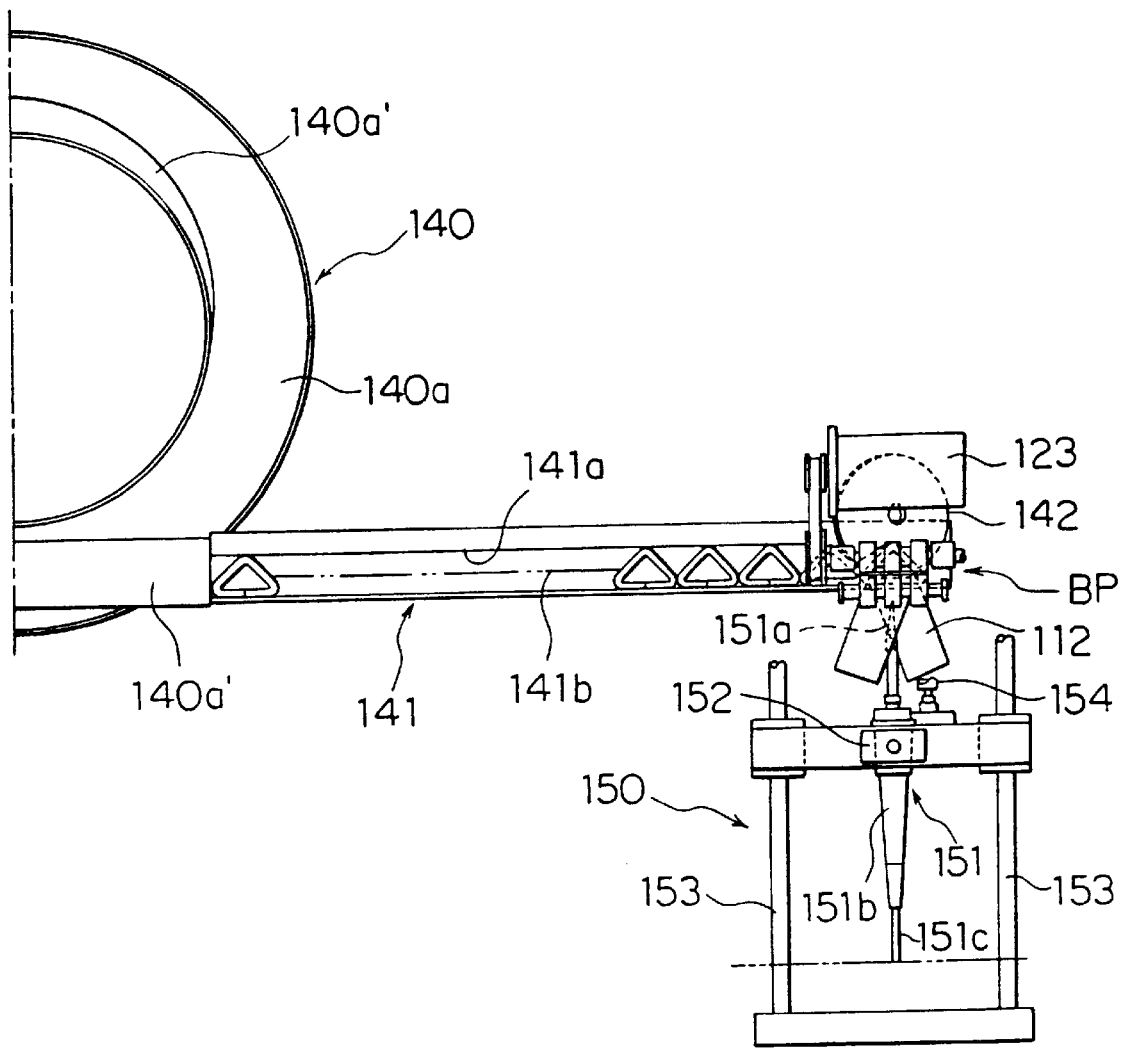
FIG. 2 is a top plan view of the machine of FIG. 1.
Figure 3:
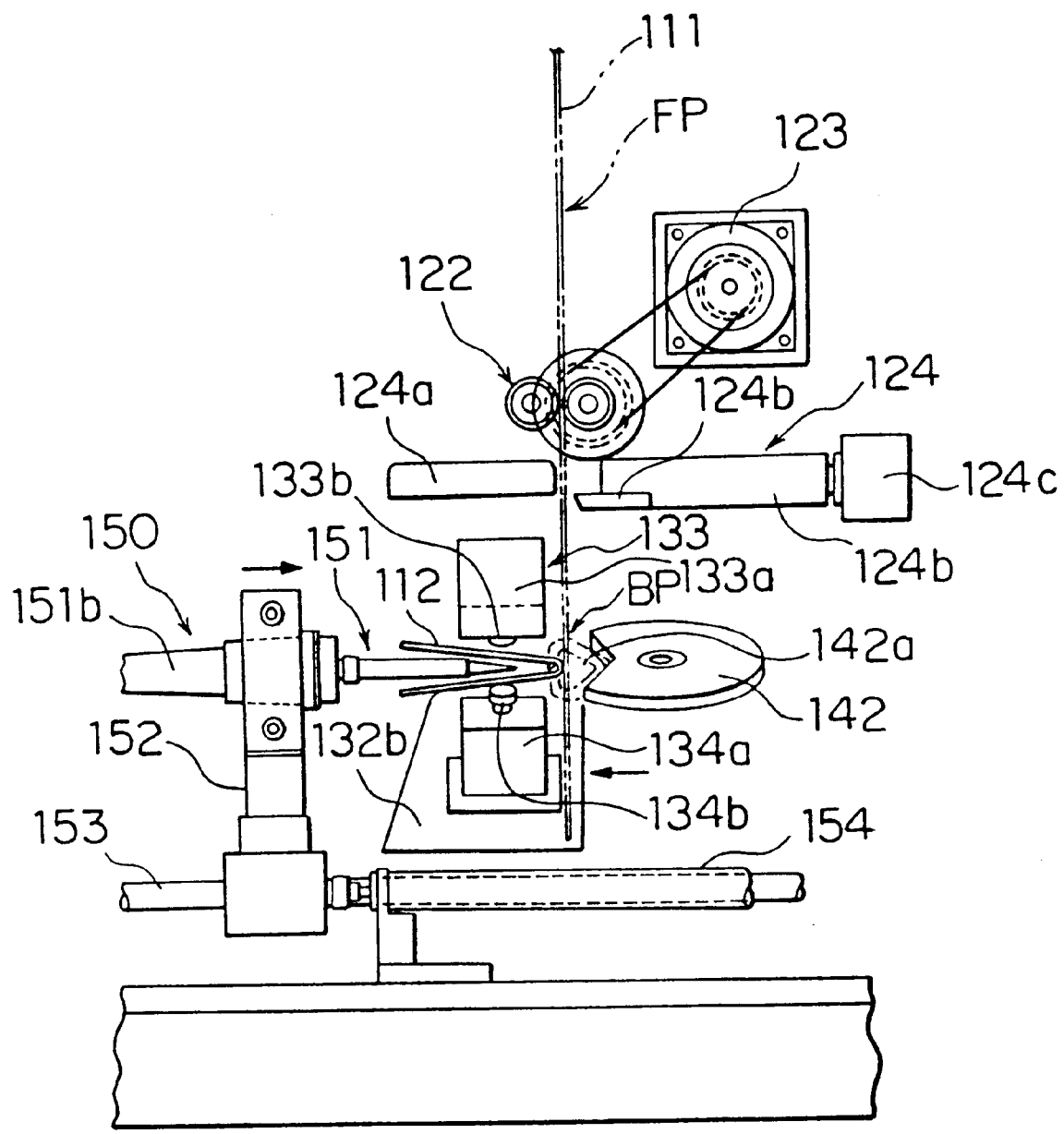
FIG. 3 is a side view, as viewed from right, of the machine of FIG. 1.
Figure 4:
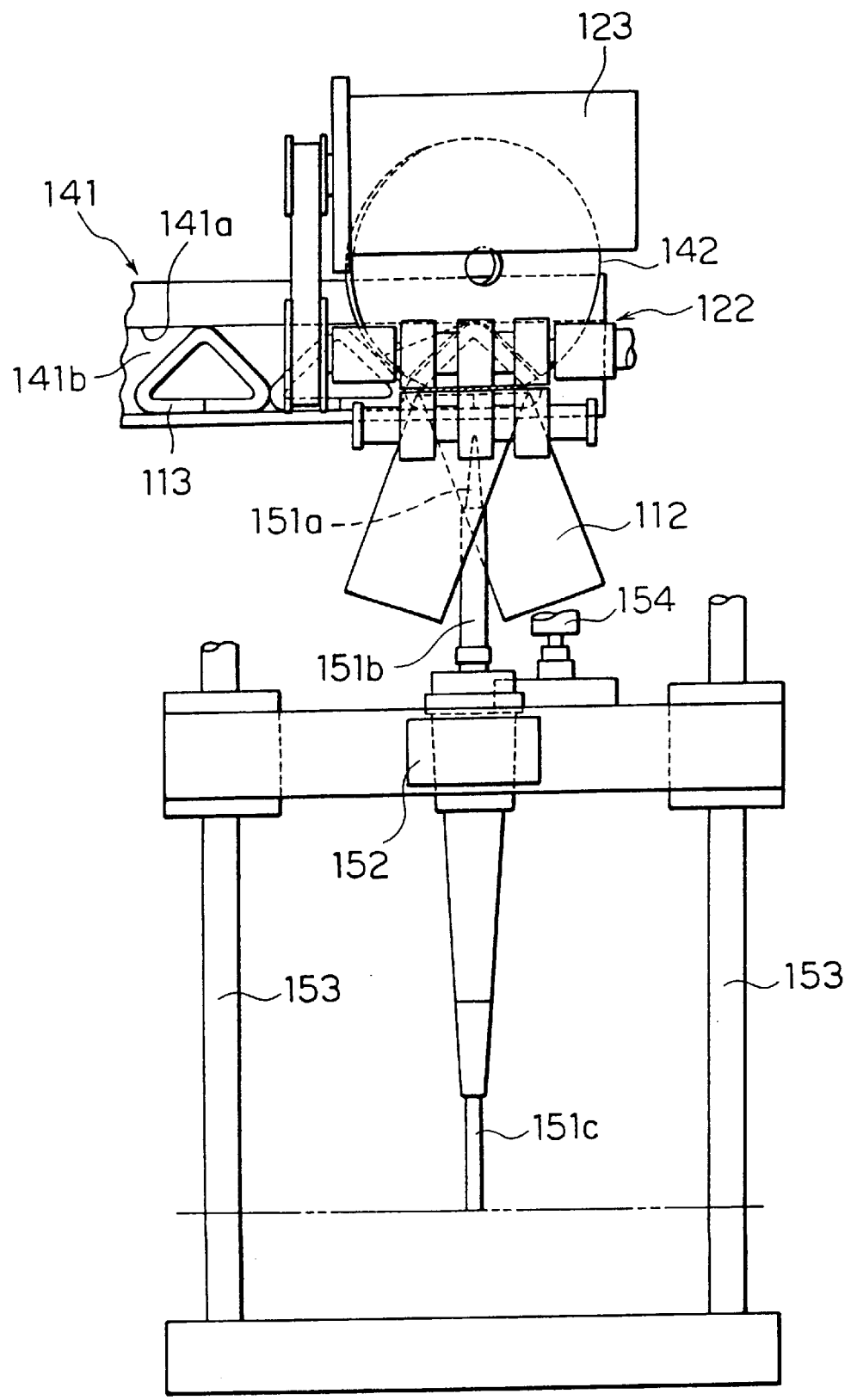
FIG. 4 is an enlarged, fragmentary view of FIG. 2.
Figure 5:
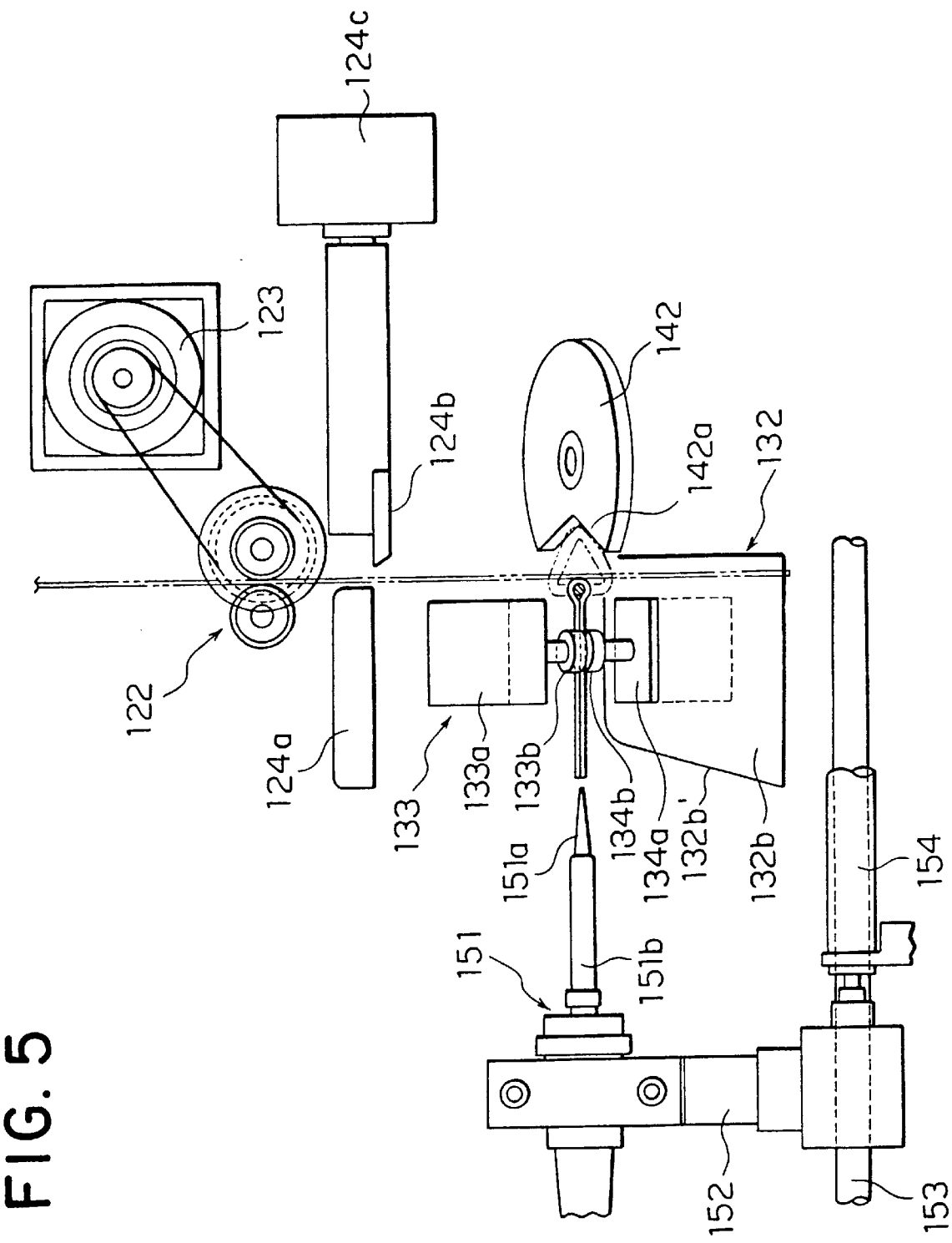
FIG. 5 is an enlarged, fragmentary view of FIG. 3.

Preferred embodiments of this invention will now be described in detail with reference to the accompanying drawings. FIGS. 1 through 3 show a machine for manufacturing tape strips, each folded about a ring, to be used as connectors in a trampoline. FIGS. 4 and 5 are detail views of the machine.

Figures 14A, 14B:
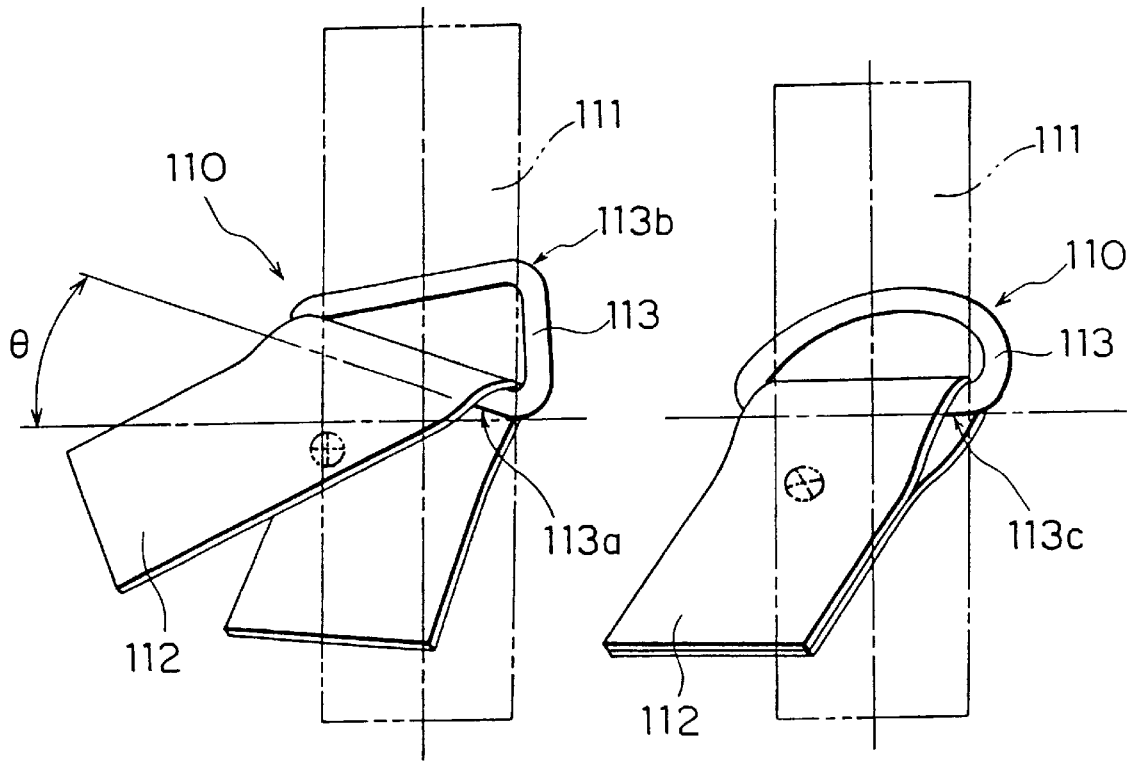
FIGS. 14A and FIG. 14B are perspective views showing different types of folding of the tape strip in the foregoing embodiments.
Figure 15:
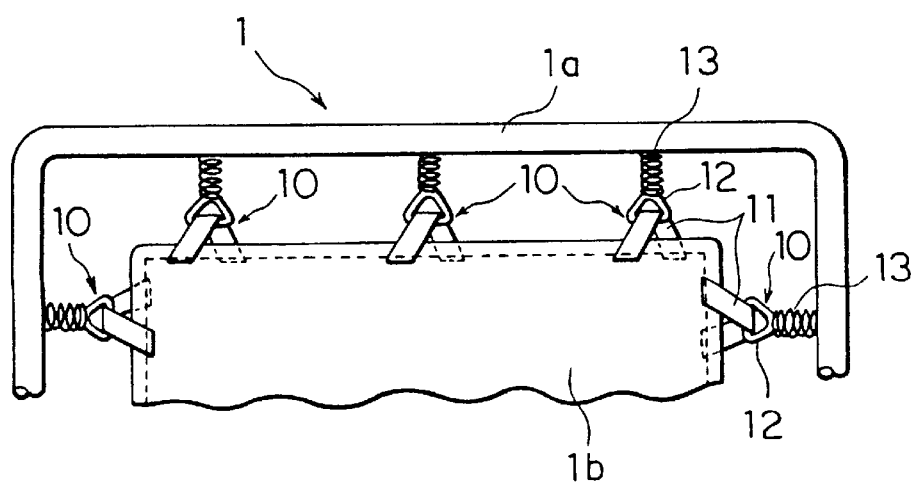
FIG. 15 is a fragmentary plan view illustrating the manner in which a frame and a sheet are connected in a trampoline.

As shown in FIG. 14A and 14B, in a tape strip 110 folded about a ring, which is to be manufactured by the machine according to one embodiment of this invention and to be used as a connector in a trampoline, a tape strip 112 is inserted through an equilateral triangular ring 113 with its bottom side 113a relatively long and is folded along the bottom side 113a so as to cross over itself at a predetermined angle, and part of the laminated portion of the folded tape strip 112 is fused at its confronting inner surfaces.

Figure 9A:
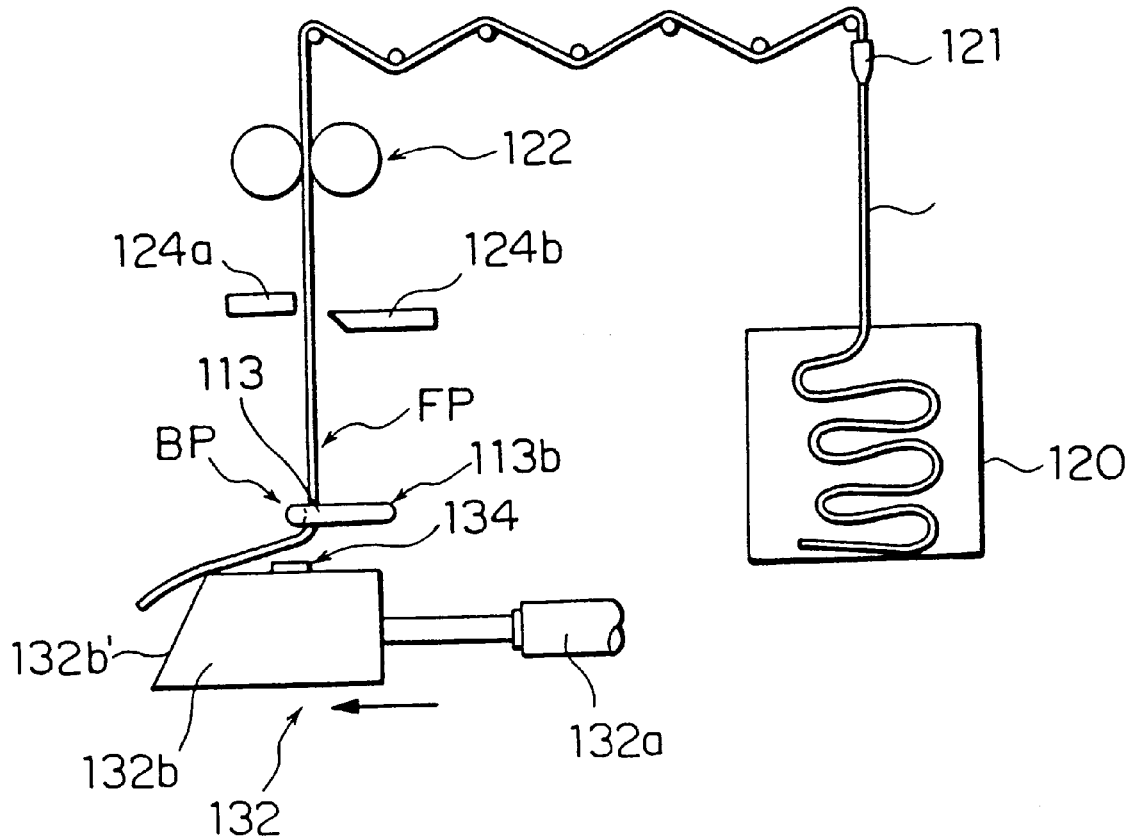
FIGS. 9A and 9B illustrate the manner in which a lower end portion of the continuous tape inserted through the ring is folded and cut.
Figure 9B:
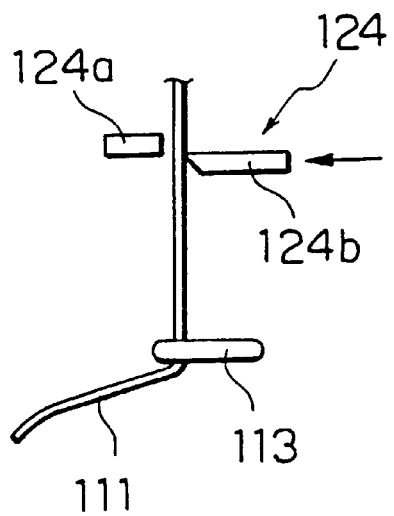

In the machine for manufacturing the tape strip 110 folded about the ring, in order to draw a continuous tape 111 from a tape container 120 accommodating in the continuous tape 111 and to positively feed vertically downwardly the continuous tape 111 to be guided by a plurality of guide rollers, as shown in FIG. 9A, a pair of tape drawer rollers 122 is situated in a vertical traveling path FP for passage of the continuous tape 111 as shown in FIGS. 1 through 5. The tape drawer rollers 122 draw the continuous tape 111 intermittently by a predetermined length at each time. In this embodiment, the length of the continuous tape 111 to be drawn at each time is set at six inches, and the rate of intermittent rotation of the tape drawer rollers 122 is controlled by a stepping motor 123. The length of the individual tape strips to be severed off the continuous tape may be selected as desired.

Figure 6A:
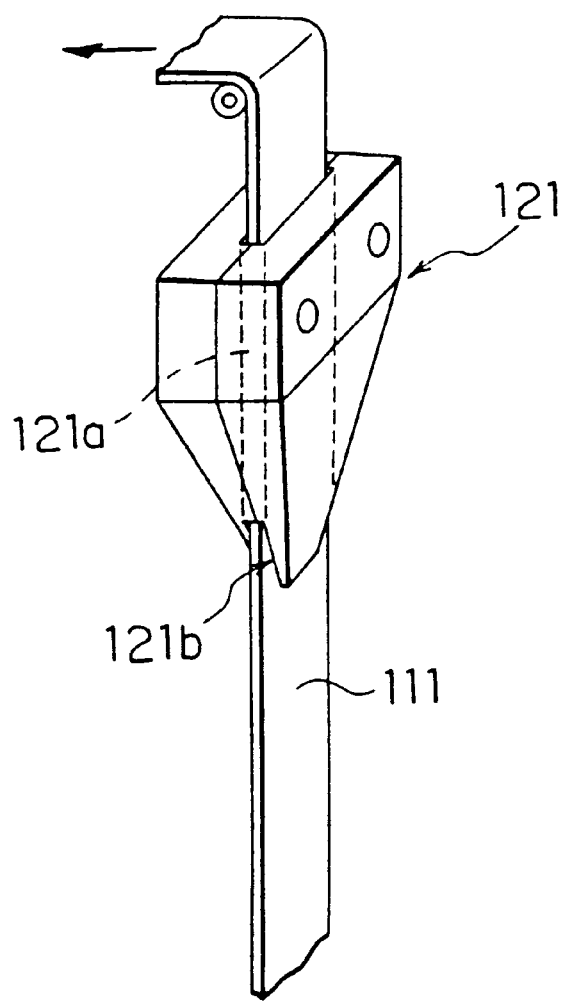
FIGS. 6A and 6B illustrate the manner in which a tape twist is corrected in a tape drawing section of the machine.

In a tape drawing path to which the continuous tape 111 of the tape container 120 is to be drawn, a tape twist correcting device 121 is situated as shown in FIG. 9A. The tape twist correcting device 121 in the form of a generally equilateral triangular body has a tape passageway 121a extending through the triangular body from its apex to the center of its bottom, as shown in FIG. 6A. The continuous tape 111 drawn from the tape container 120 is introduced into the tape twist correcting device 121 from the apex and runs toward the bottom through the tape passageway 121a. For this purpose, the tape twist correcting device 121 has at its apex a tape inlet 121b having an equilateral triangular shape substantially similar to the overall configuration of the tape twist correcting device 121.

Figure 6B:
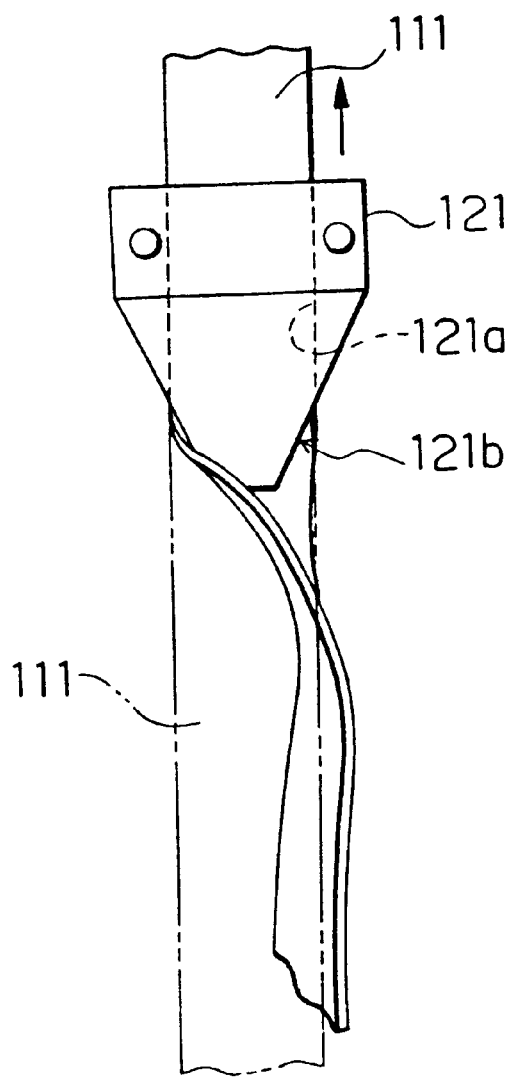
Figure 7:
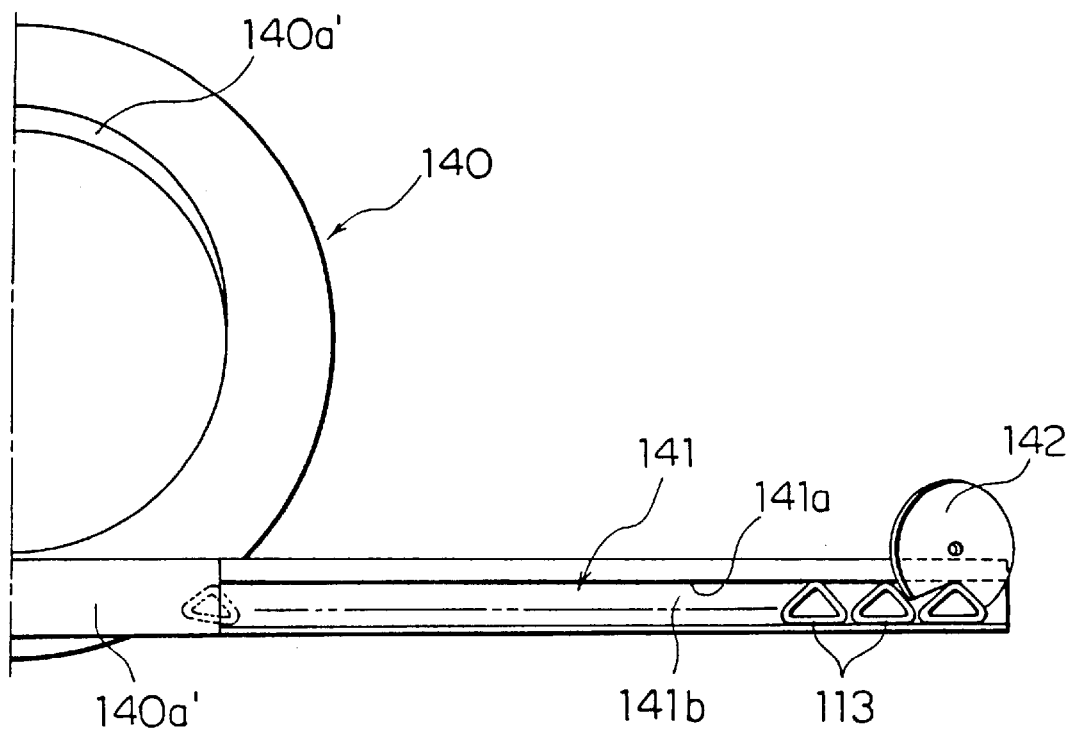
FIG. 7 is a plan view illustrating the manner in which rings are successively supplied in the machine.
Figure 8A:
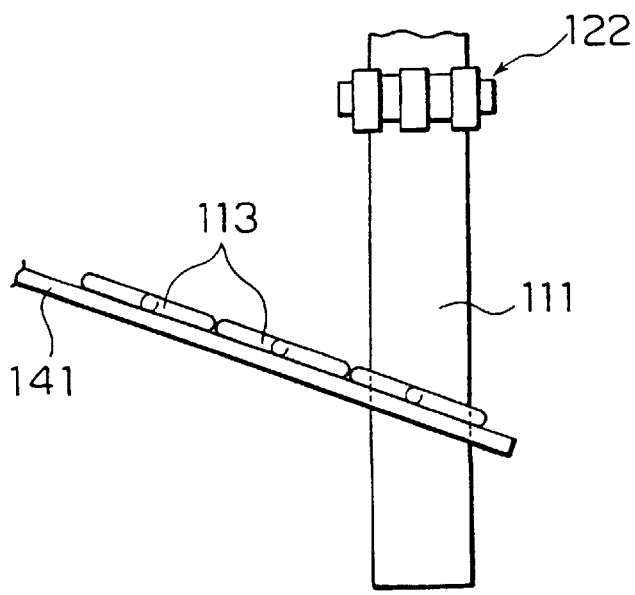
FIGS. 8A and 8B illustrate the manner in which a continuous tape is inserted through a ring in the machine.
Figure 8B:
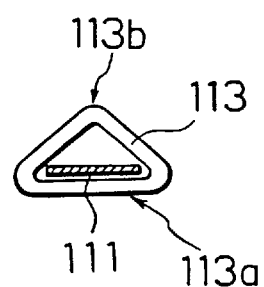

Assuming that the continuous tape 111 is twisted immediately before being introduced into the tape inlet 121b, such twisted portion of the continuous tape 111 twines round the circumferential surface of the tape inlet 121b when it enters the tape inlet 121b, as shown in FIG. 6B. With continued introduction of the continuous tape 111, the twisted portion is stroked by the tape inlet 121b so as to be opened, facilitating the subsequent running of the continuous tape 111.

A tape cutter 124 is situated immediately under the tape drawer rollers 122 (FIGS. 3 and 5). The tape cutter 124 has a set of fixed and movable blades 124a, 124b arranged one on each side of the traveling path of the continuous tape 111; the movable blade 124b is operated by a cutter-dedicated cylinder 124c. The cutter-dedicated cylinder 124c is actuated to expand upon receipt of an actuating signal from a non-illustrated control panel after a tape strip bending member 132b (described below) for bending a lower half of a tape strip 112 and when the stepping motor 123 is stopped, to sever the leading end portion of the continuous tape 111 into the above-mentioned predetermined length to provide the tape strip 112.

Figure 10:
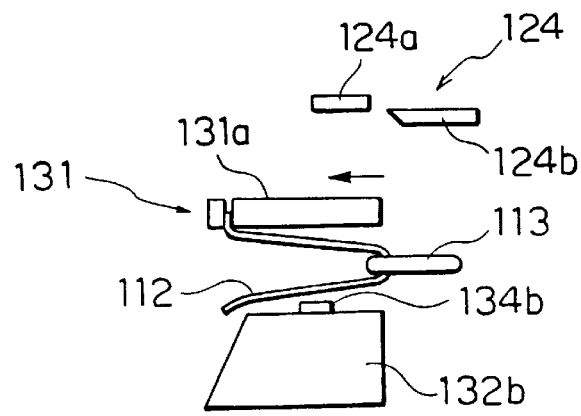
FIG. 10 illustrates the manner in which an upper half of a tape strip is bent after the tape strip is severed off the continuous tape.
Figure 11A:
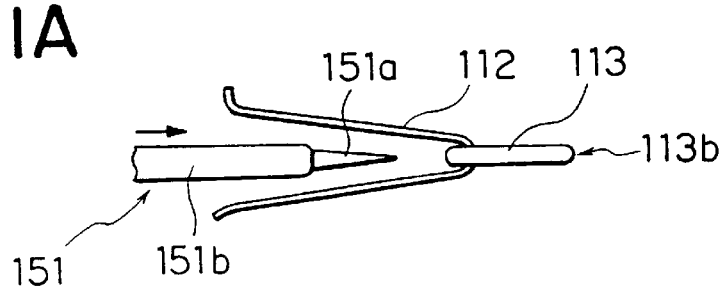
FIGS. 11A, 11B and 11C illustrate the manner in which confronting inner surfaces of the folded tape strip are melted.
Figure 11B:
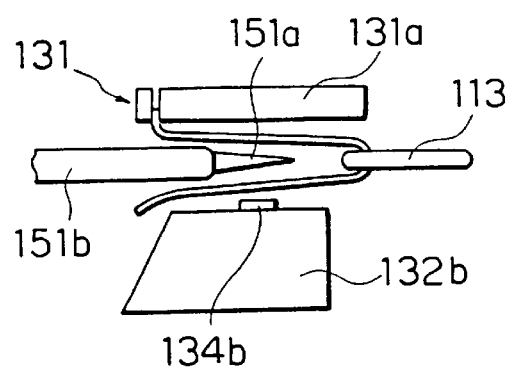
Figure 11C:
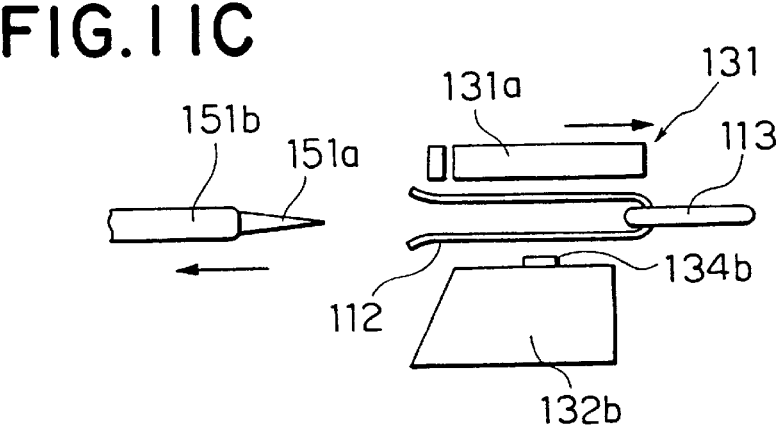
Figure 12A:
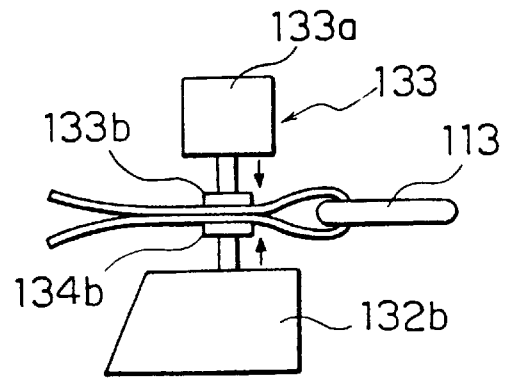
FIGS. 12A and 12B illustrate the manner in which the melted inner surfaces of the folded tape are fused.
Figure 12B:
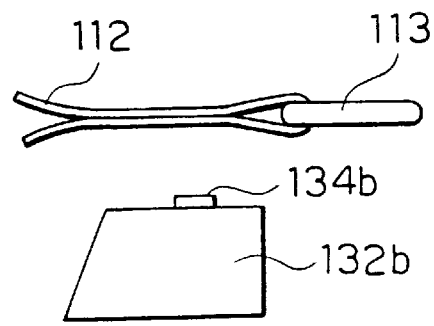

Immediately under the tape cutter 124, an upper-end-of-tape-strip gripping and shifting device (hereinafter called the upper gripping and shifting device) 131 constituting part of a tape folding device 130 is situated. The upper gripping and shifting device 131 has an upper gripping and shifting member 131a which is operable, in response to actuation of a non-illustrated tape-gripping-dedicated cylinder, to grip releasably the upper end of the severed tape strip 112 and to shift the gripped tape strip 112 horizontally in one direction, as shown in FIG. 10. The gripping and shifting action of the upper gripping and shifting device 131 is performed upon receipt of a command from the non-illustrated control panel when the feeding of the continuous tape 111 is stopped. After the bending of the lower end of the continuous tape 111 by a lower-end-of-tape-strip bending device (hereinafter called the lower bending device) 132 has been terminated, which is described below, the upper gripping and shifting device 131 is moved horizontally in one direction to bend the gripped upper half of the tape strip 112 (FIG. 10) immediately after the leading end portion of the continuous tape 11 is severed into a predetermined length by the tape cutter 124 while inserted through the ring 113. Upon termination of fusing of part of the inner surfaces of the folded tape strip 112 by a tape heating and melting device 150, the upper gripping and shifting device 131 releases the gripping of the upper end of the tape strip 112 and then retracts, as shown in FIG. 11C.

Under the upper gripping and shifting device 131, a lower-end-of-tape-strip bending device (hereinafter called the lower bending device) 132 for bending the lower end portion of the tape strip 112 is situated. The lower bending device 132 has a tape-bending-dedicated cylinder 132a and a tape strip bending member 132b, as shown in 9A, and is movable forwardly and backwardly in the same direction as the direction of movement of the upper gripping and shifting member 131a. With termination of driving of the tape drawer rollers 122 after the continuous tape 111 is inserted through the ring 113, and before the tape cutter 124 is operated, the tape-bending-dedicated cylinder 132a is actuated to move the tape strip bending member 132b horizontally across the tape traveling path. This horizontal moving causes the lower end portion of the continuous tape 111 to bend about the bottom side 113a of the ring 113 as the lower end portion of the continuous tape 111 is guided by the upper surface of the tape-strip bending member 132b. In order to perform this bending action reliably, the tape-strip bending member 132b has on the upper side of its distal end a taper surface 132b' so that the bending of the lower end portion of the hanging continuous tape 111 in the direction of bending the tape strip 112 by the upper gripping and shifting device 131 is facilitated.

In such positions not to interfere with other parts or members above and under the tape strip 112 folded by the upper gripping and shifting member 131b and the tape-strip bending member 132b, first and second pressing devices 133, 134a and 134b for pressing the upper and lower surfaces of the tape strip 112 are situated as shown in FIG. 1. The first pressing device 133 has a first pressure member 133b independently situated upwardly of the upper surface of the upper half of the tape strip 112 and movable toward and away from the upper surface of the upper half of the tape strip 112 by the action of a first pressure cylinder 133a. On the other hand, the second pressing device 134 has a second pressure cylinder 134a situated in the tape strip bending member 132b and a second pressure member 134b movable toward and away from the lower surface of the lower half of the tape strip 112 by the action of the second pressure cylinder 134a. The second pressure member 134b moves toward and away from the lower surface of the lower half of the tape strip 112 upon termination of bending of the lower half of the tape strip 112 by the tape strip bending member 132b.

Meanwhile, the ring 113 is supplied to a tape bending position BP, which is an extension of a vertical feeding path FP of the continuous tape 111, from the side of the vertical feeding path FP. For this purpose, a ring supply path 141 is situated leading to the bending position BP. As shown in FIGS. 1 and 2, one end of the ring supply path 141 is connected to an electromagnetic vibrating parts feeder 140. As a bowl 140a containing a multiplicity of rings 113 is vibrated by vibration of a non-illustrated electromagnetic vibrator of the parts feeder 140, the rings 113 in the bowl 140a are fed successively to the ring supply path 141 from a ring guide path 140a' extending spirally along the inner circumferential surface of the bowl 140a.

In this embodiment, as shown in FIGS. 1 and 2, the ring supply path 141 has a generally L-shape cross section with a vertical surface 141a and a horizontal surface 141b, extending from the parts feeder 140 toward the side of the tape bending position BP on the way to the vertical feed path FP at a predetermined angle of inclination. The rings 113 from the parts feeder 140 are fed into the ring supply path 141 in substantially the same posture; in the ring supply path 141, an apex 113b of each ring 113 slides on the vertical surface 141b of the ring supply path 141, while the bottom side 113a of the ring 113 extends parallel to the outer edge of the horizontal surface 141a and projects outwardly from the same outer edge. In order to maintain the posture of the rings 113 while they are fed in the ring supply path 141 and to facilitate the supply of the rings 113, it is preferable that a non-illustrated ring-posture correcting device and a non-illustrated ring feeding device for repeating vertical motion and reciprocating motion, respectively, by suitable drive means such as cylinders are provided on the way to the ring supply path.

The ring 113 fed to the bending position BP in the above-mentioned posture is stopped in a fixed position such as to define an adequate gap between its bottom side 113a and the outer edge of the horizontal surface 141a of the ring supply path 141 for insertion of the continuous tape 111. For this purpose, a ring positioning device 142 is situated at the end of the ring supply path 141 for positioning the ring 113 in the above-mentioned posture. In this embodiment, the ring positioning device 142 is a disc 142 turnable in timed relation with intermittent rotation of the tape drawer rollers 122 and having in its peripheral edge a cutout 142a engageable with the ring 113. From a time point when the lower end portion of the continuous tape 111 is inserted through the ring 113 until a fusing process (described below) terminates subsequent to the cutting of the tape 111 and folding of the tape strip 112, the disc 142 is stopped at the above-mentioned fixed position while the ring 113 in engagement with the cutout 142a.

During that time, a succeeding ring 113 is on standby touching the peripheral edge of the positioning disc 142. When the tape strip 112 has been attached to the preceding ring 113 to complete the manufacturing of the tape strip 110 folded about the ring 113, the positioning disc 142 makes one rotation, during which the tape strip 110 folded about the ring 113 is discharged out of the machine and, at termination of the rotation, the succeeding ring 113 is brought into engagement with the cutout 142a of the positioning disc 142. While the disc 142 is still, the tape drawer rollers 122 is driven to rotate to insert the lower end portion of the continuous tape 111 through the ring 113 via the gap defined between the bottom side 113a of the ring 113 and the outer edge of the horizontal surface 141a of the ring supply path 141 and do not stop rotating until after it draws a predetermined length of the continuous tape 111.

A tape strip heating and melting member 151 is situated in confronting relationship with the positioning disc 142 and is movable toward and away from a tape strip bending position BP on a lower extension of the vertical feed path of the continuous tape 111, as shown in FIGS. 2 and 3. The tape strip heating and melting member 151 is fixedly supported on the upper portion of a movable block of a tape strip heating and melting device 150, which is composed of a melting bar 151a, a heating body 151b supporting one end of the melting bar 151a at the front end and having a non-illustrated electric heater, and a lead wire 151c leading from the rear end of the heating body 151b. The movable block 152 of the tape strip heating and melting device 150 is mounted on two guide rails 153 extending in the direction of movement of the heating and melting member 151 and is connected to a heating-and-melting-dedicated cylinder 154. The heating-and-melting-dedicated cylinder 154 acts according to a predetermined procedure set in the control panel to move the tape strip heating and melting device 150 forwardly and backwardly along the guide rails 153, as shown in FIGS. 11A through 11C.

In response to the back-and-forth movement of the tape strip heating and melting device 150, the heating and melting member 151 moves toward and away from a central position between the first and second pressing devices 133, 134, which are situated opposite to the upper and lower surfaces, respectively, of the tape strip 112, namely, into and out of the folded tape strip 112. During its forward stroke, the heating and melting member 151 heats and fuses part of confronting inner surfaces of the upper and lower halves of the folded tape strip 112 (FIGS. 11A and 11B). Then the heating and melting member 151 soon retracts from the tape strip 112, whereupon the first and second pressing devices 133, 134 are operated to press the fused upper and lower surfaces of the folded tape strip 112 so that the inner surfaces of the tape strip 112 are fused together to finalize the manufacturing of the tape strip 110 folded about the ring, as a final product.

Upon termination of fusing the inner surfaces of the folded tape strip 112, the tape strip bending member 132b of the lower bending device 132 is lowered and, at the same time, the positioning disc 142, which has by that time been still holding the ring 113 in engagement with the cutout 142a, starts to rotate. During this rotating, the positioning disc 142, which serves as a discharging means, allows the tape strip 110 folded about the ring 113 to fall from the cutout 142a onto a gutter-like discharge path by gravity so that the tape strip 110 folded about the ring 113 out of the machine.

A significant feature of this embodiment resides in the relationship between the vertical feed path FP of the continuous tape 111 and the supply path 141 of the rings 113. As described above in connection with FIG. 14A, the tape strips 110 each folded about a ring 113, which are to be manufactured by the machine of this invention, are particularly useful when used as connectors between a frame and a sheet in a trampoline; the tape strip 112 inserted through the triangular ring 113 is folded about one side of the ring 113 in such a manner that the upper and lower halves of the folded strip 112 cross each other. The reason why the tape strip 112 is folded in cross is that since considerably great forces act on such connectors, the area of sewing each connector to the sheet has to be widened to secure a necessary strength.

Further, in order to secure adequate strength, both the tape strip 112 and the ring 113 also require a necessary strength. To this end, a rigid tape woven of large-size multifilament yarns is used as the tape strip 112. For the ring 113, a metal wire made of stainless steel or aluminum alloy is used; the metal wire is bent into a equilateral triangular shape with its bottom side 113a longest.

According to the machine of this embodiment, it is possible to fold the tape strip 112 about the ring 113 in cross automatically without requiring any laborious work. Specifically, as shown in FIGS. 1 and 3, the tape drawer rollers 122, the tape cutter 124 and the ring 113 are arranged in the same vertical plane to define a vertical straight traveling path so that the hanging continuous tape 111 can travel smoothly all the way through various processing stations. Meanwhile the ring 113 is positioned in the tape strip bending position BP in such an inclined posture that the longest or bottom side 113a extends parallel to the plane of the continuous tape 111 and is inclined with respect to the horizontal plane at a predetermined angle θ, as shown in FIG. 14A. When the hanging tape strip 112 as indicated by phantom lines in FIG. 14A is bent horizontally along the bottom side 113a inclined at the angle θ with respect to the horizontal plane, the tape strip 112 is automatically folded about the longest side 113a of the ring 113 in cross as indicated by solid lines in FIG. 14A.

This kind of tape strips 110 each folded about a ring 113, may be used as connectors in not only a trampoline but also in various other goods. For example, the tape strip 110 folded about the ring 113 may be used also as a connector between a bag and a belt as shown in FIG. 14(B). In this example, the upper and lower halves of the folded tape strip 112 are in intimate contact with each other through the entire inner surfaces about the straight portion 113a of the semicircular ring 113.

Figure 13:
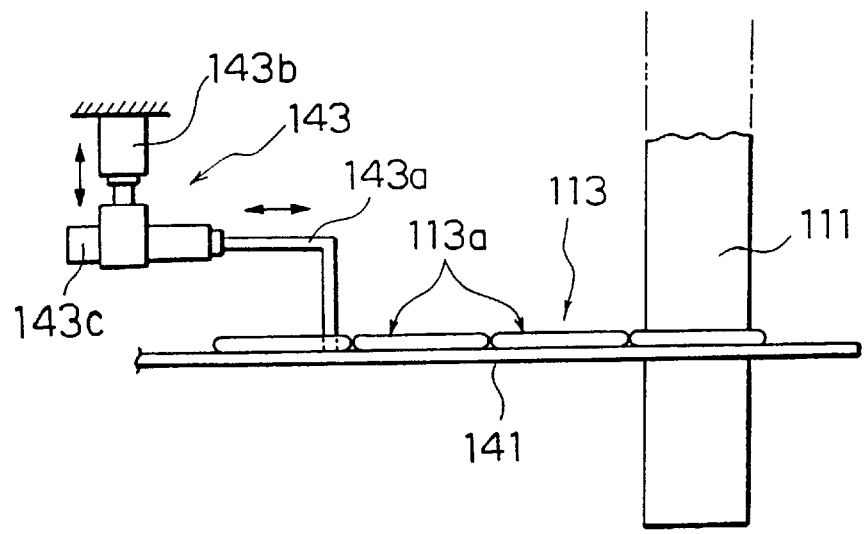
FIG. 13 is a fragmentary front view illustrating the manner in which a tape strip is inserted through a ring according to another embodiment of the invention.

FIG. 13 shows a machine, for manufacturing a tape strip 110 folded about a ring 113, which is to be used as a connector between a bag and a band. Non-illustrated parts or elements are substantially identical with those of the foregoing embodiment, so their description is limited to a minimum here.

Also in this embodiment, the continuous tape 111 is fed vertically downwardly. On the other hand, the ring 113 is supplied horizontally and is positioned on at a point of crossing of the horizontal ring supply path and the vertical tape feed path FP. At that time, the straight portion 113c of the ring 113 extends parallel to the vertical tape feed path FP. When the tape strip 112 is folded horizontally about the straight portion 113c of the ring 113, the upper and lower halves of the folded tape strip 112 are necessarily brought into intimate contact with each other through the entire inner surfaces. In the embodiment of FIG. 13, in order to positively supply the ring 113, a ring feed device 143 is situated immediately above a ring feed path 141. In order to move the ring feed device 143 so as to describe a rectangular locus in a vertical plane along the ring feed path 141, a hook-shape ring feed member 143a bent downwardly at a right angle repeats horizontal movements and vertical movements in order by a pair of cylinders 143b, 143c, respectively, which are arranged perpendicularly to each other, thus positively feeding the ring 113 toward the tape strip bending position BP. The manufacturing process of the tape strip 110 folded about a ring 113 in connection with the other parts or elements are identical with that in the connectors of a trampoline.

The foregoing embodiments described in connection with the accompanying drawings are only typical examples of this invention, and it will become manifest that various other modifications may be suggested without departing from the scope of principles of this invention.

As is apparent from the foregoing description, according to the folded strip manufacturing method, the folded strip manufacturing method and machine, and the tape twist correcting device 121, of this invention, partly since a series of manufacturing processes, such as intermittent feeding of the continuous tape 111, severing the tape 111, bending the severed tape 112, fusing of the inner surfaces of the folded tape strip 112 and discharging of the product, are performed continuously and automatically with requiring no manpower, and partly since the upper and lower halves of the folded tape strip 112 are fused at their inner surfaces, it is possible to eliminate such laborious manual works not only as sewing the tape strip in a trampoline, a bag, etc. but also as removing provisional threads and staples after sewing, thus realizing a remarkably improved rate of production.

What is claimed is:

1. A method for continuously manufacturing a folded tape strip with a ring, comprising the steps of:
    (a) successively supplying rings to a tape strip folding section via a ring supply path;
    (b) intermittently feeding, in response to intermittent driven rotation of tape drawer rollers, a continuous tape by a predetermined length at a time from a tape supply section to said tape strip folding section;
    (c) inserting a leading end portion of the continuous tape through the ring at said tape strip folding section while the continuous tape is fed;
    (d) stopping said feeding of the continuous tape when the continuous tape has been fed by said predetermined length;
    (e) severing said predetermined length of tape strip off the continuous tape, by a cutter operable when said feeding of the continuous tape is stopped, with the leading end portion of the continuous tape being inserted through the ring at the tape strip folding section;
    (f) folding the tape strip on itself through the ring by a tape strip bending means at the tape strip folding section;
    (g) fusing at least part of a laminate portion of the folded tape strip; and
    (h) discharging the resulting folded tape strip with the ring out of a folded tape strip manufacturing machine.

2. A method according to claim 1, wherein the rings are successively fed to said ring supply path by a vibrating parts feeder.

3. A method according to claim 1, wherein the rings are made of metal or synthetic resin.

4. A method according to claim 2, wherein each of the rings has a ring shape, a part of which consisting a straight portion.

5. A method according to claim 1, wherein the tape is made of woven, knit or non-woven cloth composed of thermoplastic fibers.

6. A method according to claim 1, wherein the tape is made of fiber reinforced plastic composed of various fibers and thermoplastic synthetic resin.

7. A method according to claim 1, wherein said intermittent driven rotation of said tape drawer rollers is performed by a stepping motor.

8. A method according to claim 1, wherein said folding includes bending the leading end portion of the continuous tape, with the ring threaded on the continuous tape, after said feeding of the continuous tape has been stopped, and then bending an upper half of the tape strip over a lower half of the tape strip through the ring after the tape strip has been severed off the continuous tape by said cutter.

9. A method according to claim 4, wherein the continuous tape is inserted through the ring perpendicularly to a general plane of said ring and is then folded into a completely laminate form around the straight portion of the ring.

10. A method according to claim 4, wherein the continuous tape is inserted through the ring diagonally with respect to a general plane of said ring and parallel to the straight portion of the ring and is then folded about the straight portion of the ring in a crossed form.

11. A method according to claim 1, wherein said folding is such that the tape strip is folded with its upper and lower halves in a non-contact posture, and said fusing includes melting part of confronting inner surfaces of the upper and lower halves of the tape strip by inserting a heating member into a non-contact space of the tape strip and then pressing the melted confronting inner surfaces against each other by first and second pressing means after retracting said heating member from said non-contact space.

* * * * *